US012764607B2

(12) United States Patent
Lee et al.

(10) Patent No.: US 12,764,607 B2
(45) Date of Patent: Oct. 13, 2026

(54) NETWORK BASED CONTROL OF WIRELESS COMMUNICATIONS

(71) Applicant: COMCAST CABLE COMMUNICATIONS, LLC, Philadelphia, PA (US)

(72) Inventors: Yiu Leung Lee, Philadelphia, PA (US); Nagesh Nandiraju, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/071,002

(22) Filed: Mar. 15, 2016

(65) Prior Publication Data

US 2017/0272979 A1 Sep. 21, 2017

(51) Int. Cl.

| | |
|---|---|
| ***H04W 28/20*** | (2009.01) |
| ***H04B 1/10*** | (2006.01) |
| ***H04L 12/46*** | (2006.01) |
| ***H04W 24/02*** | (2009.01) |
| ***H04W 72/00*** | (2023.01) |

(52) U.S. Cl.

CPC .............. *H04W 28/20* (2013.01); *H04B 1/10* (2013.01); *H04L 12/46* (2013.01); *H04W 24/02* (2013.01); *H04W 72/00* (2013.01)

(58) Field of Classification Search

CPC ........ H04W 28/20; H04W 24/02; H04L 12/46

See application file for complete search history.

(56) References Cited

U.S. PATENT DOCUMENTS 6,404,738 B1 * 6/2002 Reininger ........... H04L 12/5602 370/236
6,876,668 B1 * 4/2005 Chawla ................... H04L 47/52 370/230
7,454,457 B1 * 11/2008 Lowery ............... H04L 67/1001 709/224
7,606,154 B1 * 10/2009 Lee ........................... H04J 3/14 370/232

(Continued)

FOREIGN PATENT DOCUMENTS

EP 2262338 12/2010
JP 4927288 B2 * 5/2012 ........... H04B 17/336

OTHER PUBLICATIONS

Machine Translation of JP-4927288-B2 (Year: 2012).*

*Primary Examiner* — Noel R Beharry
*Assistant Examiner* — Rodrick Mak
(74) *Attorney, Agent, or Firm* — BakerHostetler

(57) ABSTRACT

Systems for network based control of wireless gateway communications are described. Each network wireless gateway and secondary network device may collect parameters and data regarding communications with connected wireless devices. The collected data may be aggregated at a Network Traffic Scheduler ("NTS"), which may use the data to identify conflicts in communications with wireless devices. If the NTS determines there are conflicts in the communications with particular wireless devices, the NTS may communicate instructions for adjusting the operations of the network so as to avoid or mitigate continued conflicting communications. In response to user requests for a particular level or quality of service, the NTS may communicate instructions for adjusting the operations of the network so as to satisfy the requested level of service.

18 Claims, 4 Drawing Sheets

(56) References Cited

U.S. PATENT DOCUMENTS 7,787,416 B2 * 8/2010 Gidwani ............... H04W 28/18 370/310
8,589,541 B2 * 11/2013 Raleigh ............... H04L 41/0893 709/224
8,811,203 B1 * 8/2014 Liu ....................... H04W 24/02 370/252
9,775,001 B2 * 9/2017 Dunkin ................. H04W 4/029
9,819,610 B1 * 11/2017 Crump .................. H04L 47/805
10,560,379 B1 * 2/2020 Ghosh ................. H04L 43/0888
2002/0059378 A1 * 5/2002 Mustafa ............. H04L 65/1069 709/205
2005/0215284 A1 * 9/2005 Su ..................... H04W 72/1215 455/556.2
2006/0135114 A1 * 6/2006 Sakai .................... H04W 76/15 455/403
2007/0149230 A1 * 6/2007 Song ..................... H04W 72/02 455/515
2008/0080369 A1 * 4/2008 Sumioka ............... H04L 1/1887 370/229
2008/0146241 A1 * 6/2008 Das ....................... H04L 1/0002 455/450
2009/0016279 A1 * 1/2009 Beser ...................... H04W 4/02 370/329
2009/0017832 A1 * 1/2009 Tebbs .................... H04W 24/02 455/450
2009/0063557 A1 * 3/2009 MacPherson ............ G06N 5/02
2009/0253421 A1 * 10/2009 Camp, Jr. ............. H04W 24/02 455/418
2010/0188998 A1 * 7/2010 Pernu .................. H04L 41/0806 370/252
2010/0311450 A1 * 12/2010 Rinne .................. H04L 5/0007 455/501
2010/0311455 A1 * 12/2010 Armstrong .......... H04L 47/2433 455/512
2011/0021153 A1 * 1/2011 Safavi .................. H04B 7/0434 455/63.1
2011/0039547 A1 * 2/2011 van Rensburg ... H04W 72/1252 455/423
2011/0044262 A1 * 2/2011 Satapathy ............... H04W 8/04 370/329
2011/0096706 A1 * 4/2011 Ramasamy ........... H04W 68/02 455/458
2011/0292886 A1 * 12/2011 Lee ....................... H04W 16/04 370/329
2012/0077532 A1 * 3/2012 Kadous ................. H04W 16/14 455/507
2012/0201252 A1 * 8/2012 Subramanian ........ H04L 45/125 370/401
2012/0207032 A1 * 8/2012 Chen ..................... H04W 28/18 370/252
2012/0236715 A1 * 9/2012 Vitt ....................... H04L 47/822 370/230
2012/0236716 A1 * 9/2012 Anbazhagan ....... H04L 41/5022 370/235
2012/0275309 A1 * 11/2012 Jalil ...................... H04L 45/124 370/238
2013/0111038 A1 5/2013 Girard
2013/0201866 A1 * 8/2013 Wentink .............. H04W 76/023 370/253
2013/0235905 A1 * 9/2013 Serizawa ............... H04B 1/713 375/132
2013/0301609 A1 * 11/2013 Smith ................... H04W 16/14 370/329
2014/0098681 A1 * 4/2014 Stager ................... H04W 24/02 370/252
2014/0105048 A1 4/2014 Tellado et al.
2014/0376377 A1 * 12/2014 Mikoda ................. H04W 24/02 370/235
2015/0049616 A1 * 2/2015 Ho ........................ H04W 24/02 370/252
2015/0072697 A1 * 3/2015 Shen ..................... H04W 16/10 455/450
2015/0189660 A1 * 7/2015 Morioka ............... H04L 5/0064 370/329
2015/0215784 A1 * 7/2015 Gunasekara .......... H04L 63/102 455/411
2015/0257024 A1 * 9/2015 Baid ..................... H04W 24/10 370/338
2015/0280888 A1 10/2015 Karsi et al.
2016/0029404 A1 * 1/2016 Aryafar ............. H04W 72/1231 370/277
2016/0037544 A1 * 2/2016 Wang .................... H04W 88/06 370/329
2016/0044599 A1 * 2/2016 Damnjanovic ....... H04W 76/15 455/522
2016/0149815 A1 * 5/2016 Cotter ..................... H04L 47/24 370/235
2016/0249373 A1 * 8/2016 Celebi ............... H04W 52/0206
2016/0309388 A1 * 10/2016 Gunasekara ........ H04W 76/025
2017/0070976 A1 * 3/2017 Shirakawa ............ H04W 48/20
2017/0164416 A1 * 6/2017 Yeddala ................ H04W 36/30
2017/0188241 A1 * 6/2017 Mueck .................. H04W 16/14
2017/0272696 A1 * 9/2017 Li .......................... H04H 20/69
2017/0280340 A1 * 9/2017 Zhu ....................... H04W 24/04
2018/0316779 A1 * 11/2018 Dowlatkhah ......... H04W 24/02
2018/0316799 A1 * 11/2018 Shaw .................. H04L 12/1403

* cited by examiner

NETWORK BASED CONTROL OF WIRELESS COMMUNICATIONS

BACKGROUND

Wireless gateways, such as WiFi gateways, typically use radio spectrum to communicate wirelessly with devices. The radio bandwidth is limited, however. Accordingly, wireless devices compete for the limited radio spectrum that is available to communicate with a wireless gateway. In some instances, excessive demand for communications using the limited bandwidth results in a degraded or slowed user experience at user devices. Further, wireless gateways may use the same radio spectrum as other gateways that are operating in the same area. Where wireless gateways are in close proximity and are using the same radio spectrum for communication, there may be interference between the signals transmitted and received at the gateways.

SUMMARY

Existing network systems lack the capability to control communications in a network so as to dynamically minimize communication conflicts between wireless gateways and wirelessly connected devices. In existing networking architectures that have wireless gateways attached thereto, little or no information is collected by the network regarding the operating characteristics of wireless devices that attach to the wireless gateways. The wireless gateways operate according to pre-established rules independently of the rest of the network. Devices that are responsible for communicating data to the wireless gateways such as, for example, cable modem termination systems (CMTSs) likewise have static configurations. Regardless of the status of communications between wireless gateways and the wirelessly connected devices, the operations of the CMTSs in exchanging data with the wireless gateways do not change. Accordingly, the communication of data in the network and through the wireless gateways to the wireless devices is not dependent upon the circumstances at the wireless gateways.

Systems and methods are described for network-based control of wireless gateway communications. Each network wireless gateway and secondary network device in a network may collect parameters and data regarding communications with connected wireless devices. The collected data is communicated to a system which may be referred to as a Network Traffic Scheduler ("NTS"). The NTS uses data forwarded from the various wireless gateways to map the relative locations of wireless devices and corresponding wireless gateways and secondary network devices. The NTS processes the received data to identify conflicts in communications with wireless devices.

If the NTS determines there are conflicts in the communications with particular wireless devices, gateways, secondary network devices, or any combination thereof, the NTS may determine and communicate instructions for adjusting the operations of the network so as to avoid or mitigate continued communications conflicts. Adjustments may include any suitable method of solving or mitigating network conflicts, including but not limited to the changing of communication channels, the time devices receive packets, packet priority, and device priority.

The NTS may be programmed to dynamically adjust network traffic based on quality of service (QoS) levels requested by a user. After receiving the request, the NTS may process the previously gathered data regarding operations of the gateways and secondary network devices to determine adjustments to the network so as to provide the requested level or quality of service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Existing network systems lack the capability to control communications in a network so as to dynamically minimize communications conflicts between wireless gateways and wirelessly connected devices. In existing networking architectures that have wireless gateways attached thereto, little or no information is collected regarding the operating characteristics of wireless devices that attach to the wireless gateways. The wireless gateways operate according pre-established rules independently of the rest of the network. Accordingly, the communication of data in the network and through the wireless gateways to the wireless devices does not change depending upon the circumstances at the wireless gateways.

Systems and methods are described for network-based control of wireless gateway communications. Network resources and parameters may be adjusted based on information received from the wireless gateways and can heuristically view and adjust network parameters based on inputs from various wireless gateways about applications and usages in the same proximity or region. Each network wireless gateway and connected secondary network devices may collect parameters and data regarding communications with connected wireless devices. The collected data may be aggregated at a Network Traffic Scheduler ("NTS"), which may use the data to identify conflicts in communications with wireless devices. If the NTS determines there are conflicts in the communications with particular wireless devices, the NTS may determine and communicate instructions for adjusting the operations of the network, such as, for example, controlling bandwidth or communication channels, so as to avoid or mitigate continued communications conflicts.

Figure 1:
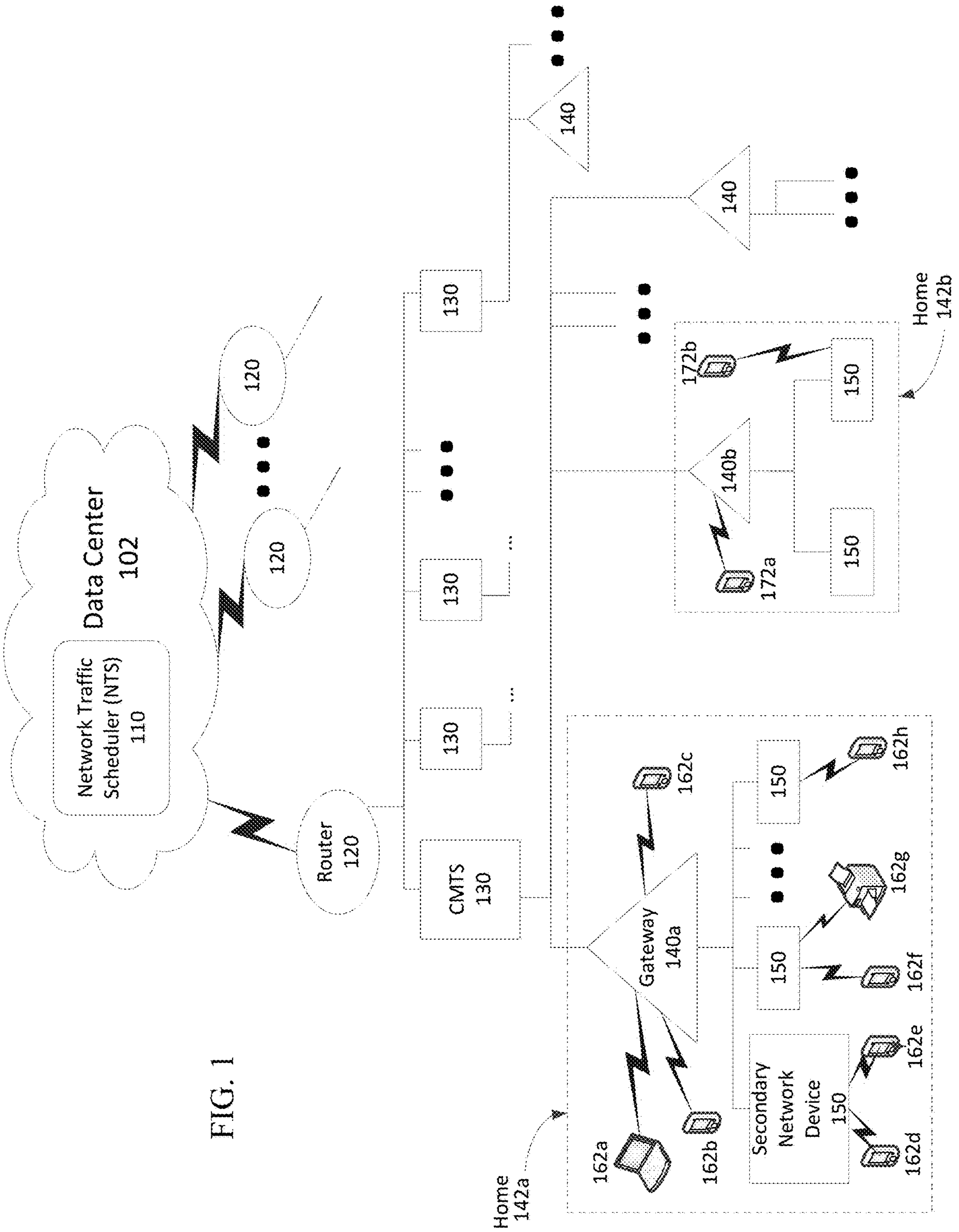
FIG. 1 depicts an example communication network.

FIG. 1 is a diagram of an example communication network 108. The communication network 108 may be any that is suitable for performing operations consistent with the processing described herein, such as, for example, an Internet Service Provider's (ISP's) network. The communication network 108 is adapted to support cable television programming distribution and Internet services. As shown, the example communication network 108 comprises a data center 102. The data center 102 comprises computing systems such as, for example, the Network Traffic Scheduler (NTS) 110, that are programmed to receive and process data for purposes of scheduling communications within the network. The communications network 108 may be arranged in a hierarchical architecture, and the data center 102 may be situated at any appropriate level within the hierarchy. For example, the data center 102 may operate as a main ISP data center or as a regional data center. The data center 102 may aggregate information from connected components in lower tiers of the hierarchy and, based upon the aggregated information, control the delivery of data to wireless devices connected to the network via wireless gateways.

The data center 102 may be in communication with other devices in the communication network 108 via any suitable means. For example, as depicted in FIG. 1, the data center 102 is in communication with a plurality of routers 120. Each router 120 communicates data to and from a particular region of the network 108. In the example depicted in FIG. 1, each router 120 is in communication with one or more cable modem termination systems (CMTSs) 130. Hundreds of CMTSs 130 may be in communication with one router 120 and are considered to be part of a particular region. The router 120 is programmed to communicate data to and from each of the CMTSs 130 that it is in communication with. Each CMTS 130 may operate as a management point for a subsection of a region and may service one or more neighborhoods or communities.

Each CMTS 130 is in communication with a plurality of access points or gateways 140. Thousands of gateways 140 may be in communication with any one CMTS 130. The gateways 140 operate to provide devices with access to networks beyond the gateway and may be any system suitable to provide gateway access, including, for example, a cable modem, a cable set top box, etc. The access points or gateways 140 may be adapted to communicate wirelessly with devices. For example, the gateways 140 may comprise a wireless router adapted for WiFi communication with devices. The gateways 140 may be adapted to route communications between devices and network devices such as, for example the CMTSs 130. In the example depicted in FIG. 1, each gateway 140 is located in a home 142 or business. The devices 162*a*, 162*b*, and 162*c*, each of which may be any suitable device including, for example, a phone, tablet, laptop, television, etc., communicate with the gateway 140*a* in the home 142*a*. One or more secondary network devices 150 may be in communication with a gateway 140. The secondary network devices 150 may perform a variety of functions, including the ability to extend the reach of the wireless network that communicates through the particular gateway. For example, a secondary network device 150 may comprise a WiFi network extender. In the example depicted in FIG. 1, in the home 142*a*, a plurality of secondary network devices 150 are in communication with the gateway 140*a*. The secondary network devices 150 may be in communication with the gateway 140*a* in any suitable manner including via a physical connection such as fiber or via wireless communication. The devices 162*d-h* communicate with the gateway 140*a* and the network beyond the gateway via the extended wireless signals provided by the secondary network devices 150.

A plurality of gateways 140 may be coupled to each CMTS 130, with each gateway 140 situated in a separate home or office. As illustrated in FIG. 1, a second home or living unit 142*b* has a gateway device 140*b* therein which may establish a wireless radio communication network. Wireless devices such as the device 172*a* may communicate wirelessly with the gateway 140*b* in order to send and receive data from devices beyond the gateway 140*b*. The secondary network devices 150 are in communication with the gateway device 140*b* and may extend the radio signal so as to allow for devices such as the device 172*b* to communicate with the gateway device 140*b* and devices beyond the gateway 140*b*.

Each gateway 140 has limited bandwidth with which it may communicate with devices. Accordingly, when there are a plurality of devices that communicate with a gateway, the plurality of devices compete for the limited radio bandwidth available to communicate with the gateway 140. For example, in the home 142*a*, the devices 162*a-c* all must use the same limited radio spectrum for communication with the gateway 140*a*. When there are communications from/to two different devices, communications relating to one of those devices may be delayed while the communications relating to the other device proceed. Accordingly, during periods of high demand from the devices 162*a-c*, there may be degraded communications between the devices 162*a-c* and the gateway 140*a*. The secondary network devices 150 likewise have limited radio bandwidth for communicating with the devices 162*d-h*. Accordingly, during periods of high demand from the devices 162*d-h*, there may be degraded communications between the devices 162*d-h* and the secondary network devices 150. Similarly, in the home 142*b*, the devices 172*a* and 172*b* must use the same limited radio spectrum for communication with the gateway 140*b*.

In physical environments wherein homes or living units are in close proximity to each other, the radio signals generated by gateways 140 and secondary network devices 150 in adjoining homes or businesses may overlap. In other words, the radio signals generated by a gateway 140 or a secondary network device 150 in a first home may be detectable by devices in a second home. As a consequence, the communications between devices and gateways or secondary network devices may interfere with each other and result in degraded quality of service. Referring to FIG. 1, the home 142*a* and the home 142*b* may each have a private WiFi network provided by their respective gateways 140*a* and 140*b* and respective secondary network devices 150. It is possible that the gateway 140*a* providing service to the home 142*a* and the gateway 140*b* providing service to the home 142*b* provide WiFi networks communicating on identical communication channels. For example, the gateway 140*a* of the home 142*a* may use channel 1 of the 2.4 GHz wireless spectrum for communications, and the gateway 140*b* of the home 142*b* may also use channel 1 of the 2.4 GHz wireless spectrum for communications. Because the respective gateways 140*a* and 140*b* are operating on the same communication channel and the homes 142*a* and 142*b* are in close proximity to one another, it is likely that the devices 162*a-h* and 172*a-b* will encounter WiFi communication interference and receive reduced QoS.

The disclosed systems may process performance data from the gateways 140 and the secondary network devices 150 and, based upon aggregated performance data, may schedule or manage communications in the network through the gateways so as to avoid or mitigate interference in communications between gateways and devices. Each level of the network hierarchy may collect data from the next lower level and send it to the next highest level. The collection and forwarding of data to a higher level in the network may continue until it reaches the NTS 110. For example, in the home 142*a*, each secondary network device 150 may collect network parameters and other data regarding the devices 162*d-h* wirelessly connected to it, including, for example, which communication channels the devices 162*d-h* are using, and sends this data to the connected gateway 140*a*. The gateway 140*a* may collect network parameters relating to the devices 162*a-c* that directly communicate with it. The secondary network devices 150 and the gateway 140*b* may perform similar data aggregation in the home 142*b* for the wirelessly connected devices 172*a-b*. In each home 142*a-b*, the gateway 140 may aggregate the data from the secondary network devices 150 in its local network hierarchy and send that data to its connected CMTS 130, which may send the data to its connected router 120, which may then send the data to the NTS 110 in the data center 102. Alternatively, the data may be sent to the NTS 110 directly from the gateways 140*a* and 140*b* or the CMTS 130.

The NTS 110 may analyze the received data and adjust communications in the network so as to resolve or mitigate communication conflicts in the network and provide better QoS to the connected devices 162*a-h*, 172*a-b*. Adjustments may include any suitable method of solving or mitigating network conflicts, including but not limited to: changing communication channels used by the gateways 140 and the secondary network devices 150; changing the time packets directed to particular user devices are transmitted and received; changing the priority of data packets directed to particular devices; queuing data directed to particular devices; and changing the priority given to a particular device during wireless communications. For example, the NTS 110 may instruct the gateway 140*a* to use channel 2 of the 2.4 GHz spectrum, instead of channel 1, to communicate with the devices 162*a-c*. This allows unfettered communication for the gateway 140*a* on channel 2 and the gateway 140*b* on channel 1. In another example, the NTS 110 may schedule delivery of packets to the gateway 140*a* intended for the device 162*a* at a determined interval from delivery of packets to the gateway 140*b* intended for the device 172*a* so that the corresponding communications between the gateway 140*a* and the device 162*a* take place at a different time than the communications between the gateway 140*b* and the device 172*a*. In another example, the NTS 110 may intelligently queue packets to control the delivery of packets. The NTS 110 may allow packets directed to a first device or the gateway 140*a* to proceed through the network, while packets directed to a second device or the gateway 140*b* would be queued at the CMTS 130 or other suitable point in the network. Once the first device or the gateway 140*a* has received the communicated packets, packets directed to the second device or the gateway 140*b* may be released from the queue and communicated via the network to the second device or the gateway 140*b*. While packets are delivered to the second device or the gateway 140*b*, packets directed to the first device or the gateway 140*b* may be queued. In yet another example of adjustments to the network resources and parameters, the NTS 110 may instruct the gateway 140*a* to assign priorities to packet types and process packets accordingly. For example, streaming video packets might have higher priority than web browsing packets. So, if the device 162*a* is processing streaming video and the device 162*b* is only web browsing, the gateway 140*a* will process the streaming video packets for the device 162*a* before the web browsing packets for the device 162*b*. Another example method of solving or mitigating network conflicts includes assigning priority to devices. For example, the device 162*a* may be assigned highest priority, the device 162*b* may be assigned second priority, etc. Using this method, the gateway 140*a* may process the packets for the device 162*a* before those of all other devices, followed by packets for the device 162*b*, then those for the device 162*c*, etc. Such adjustments may be implemented at the CMTS-level 130, the gateway-level 140, the secondary network devices-level 150, or any combination thereof and may be updated dynamically as the devices 162*a-h*, 172*a-b* enter and exit any level of the network. To implement dynamic updating, a feedback loop may be introduced wherein the gateways 140 and secondary network devices 150 may continually report network data through the hierarchy to the NTS 110, which may then dynamically adjust existing service flows based on that information.

Figure 2:
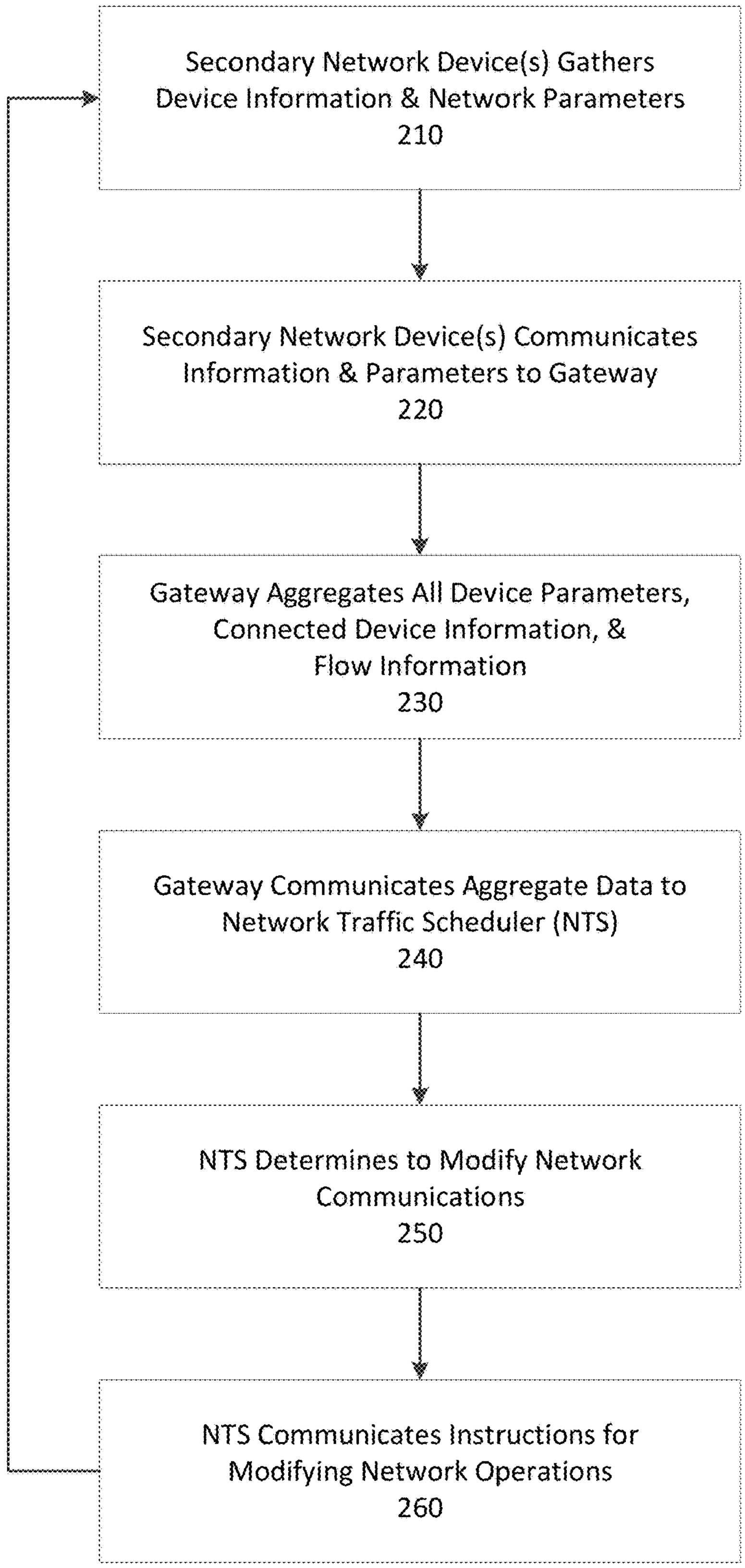
FIG. 2 depicts a flow diagram of an example process for collecting and processing network information.

FIG. 2 is a flow diagram depicting an example process for scheduling communications in a network and thereby providing better QoS to connected devices. Although FIG. 2 is depicted as a sequence of blocks, the depicted sequence should not be construed as limiting the scope of the present disclosure. In various cases, aspects, and embodiments, the blocks and described operations may be altered, omitted, reordered, or performed in parallel. For purposes of illustration, reference is made to the network described in connection with FIG. 1, although any suitable network and systems may be used to implement the described processing.

Referring to FIG. 2, at block 210 secondary network devices 150 gather network parameters and device information for the devices communicating with the particular secondary network devices. For example, the secondary network devices 150 in the home 142*a* may collect network parameters and device information for the devices 162*d-h* which are wirelessly connected to the secondary network devices 150. The secondary network devices 150 in the home 142*b* may collect network parameters and device information for the device 172*b*. The network parameters and device information collected may be any that is suitable for use in determining the operation of the devices within the network and identifying potential conflicts in communications with devices. For example, secondary network devices 150 may collect data regarding the following for each wireless device: an identifier for the particular device; an identifier of the secondary network device with which the device communicates; a communication channel used to communicate with the particular device; collisions or interference experienced by the device in communicating with the relevant secondary network device; a quality of signal received by the device, e.g., signal to noise ratio (SNR); and the amount of data sent and received by the device. At a programming level, secondary network devices 150 may collect the following parameters from each of their connected wireless devices: number of bytes sent; number of bytes received; number of packets sent; number of packets received; number of errors sent; number of errors received; number of unicast packets sent; number of unicast packets received; number of discard packets sent; number of discard packets received; number of multicast packets sent; number of multicast packets received; number of broadcast packets sent; number of broadcast packets received; and number of unknown protocol packets received.

At block 220, each secondary network device 150 communicates the device and network parameters that were collected at block 210 to the particular gateway 140 to which the secondary network device 150 is connected. For example, the secondary network devices 150 in the home 142*a* communicate device information and network parameters to the gateway 140*a*, which receives and stores the data. The secondary network devices 150 in the home 142*b* communicate device information and network parameters to the gateway 140*b*, which receives and stores the data. The secondary network devices 150 may gather and forward data to the gateways 140 at regular intervals such as, for example, every 5 minutes. Accordingly, the data at the gateways 140 reflects current system performance.

In addition to receiving performance and device data from the secondary network devices 150, the gateways 140 may gather network parameters and data relating to devices that are wirelessly connected to the gateways 140 (as opposed to the secondary network devices 150). For example, the gateway 140*a* may collect network parameters and data regarding the devices 162*a-c* which are wirelessly connected to the gateway 140*a*. Similarly, the gateway 140*b* in the home 142*b* may collect network parameters and data regarding the device 172*a*. The data collected may include the following for each wireless device: an identifier for the particular device; an identifier of the gateway with which the device communicates; a communication channel used to communicate with the particular device; collisions or interference experienced by the device in communicating with the relevant gateway; a quality of signal received by the device, e.g., signal to noise ratio (SNR); the amount of data sent and received by the device. As with the secondary network devices 150, gateways 140 may also gather programming-level parameters such as number of bytes sent, number of bytes received, number of packets sent, number of packets received, number of errors sent, number of errors received, number of unicast packets sent, number of unicast packets received, number of discard packets sent, number of discard packets received, number of multicast packets sent, number of multicast packets received, number of broadcast packets sent, number of broadcast packets received, and number of unknown protocol packets received.

As a result of the processing associated with blocks 210 and 220, the gateway 140*a* of the home 142*a* now has network and device information relating to all of the devices 162*a-h* that communicate through the gateway 140*a*. Similarly, the gateway 140*b* of the home 142*b* has network and device information for each of the devices 172*a-b*.

At block 230, each of the gateways 140 aggregate the network parameter data and device data. For example, the gateway 140*a* may aggregate the network parameter data and device data that were received from the secondary network devices 150 and from the devices 162*a-c* that are wirelessly coupled to the gateway 140*a*. Similarly, the gateway 140*b* may aggregate the network parameter data and device data that were received from secondary network devices 150 in the home 142*b* and from the device 172*a* that is wirelessly coupled to the gateway 140*b*.

At block 240, the gateways 140 communicate the aggregated data to the NTS 110. Communication to the NTS 110 may be performed via any suitable method, including, for example, communication up through the hierarchy of layers between the gateways and the NTS. For example, each gateway 140 may send aggregated data to its connected CMTS 130, which then sends the data to its connected router 120, which then sends the data to the NTS 110 in the data center 102. Alternatively, the data may be sent to the NTS 110 directly from the gateway 140 or the CMTS 130 via known cloud computing communication methods.

At block 250, the NTS 110 determines to modify or adjust network communications based on the received data. The NTS 110 may determine to adjust network communications in any suitable manner. For example, the NTS 110 may analyze the received data and make adjustments to the network, such as, for example, controlling bandwidth or communication channels, in order to avoid or mitigate communication interference and provide improved QoS to the connected devices 162*a-h*, 172*a-b*. The NTS 110 may process the received data and create a WiFi transmission map identifying communication channels of the various network components and devices and how they relatively positioned. For example, as depicted in FIG. 1, the NTS 110 may identify the particular secondary network devices 150 that are connected to the gateways 140*a* and 140*b*. Further, the NTS 110 may identify the particular devices that are communicating with each of the secondary network devices 150 and the gateways 140*a* and 140*b*. The NTS 110 may determine that the gateway 140*a* and the gateway 140*b* are in close proximity and that the communication signals from the gateways overlap.

The NTS 110 may further identify adjustments to the communications in the network that reduce communication conflicts in the network. Adjustments may include any suitable modification that resolves or mitigates actual and/or potential communication conflicts. For example, the NTS 110 may determine to change the communication channels that gateways and wireless devices use for communication. In an example scenario, the NTS 110 may determine that the gateways 140*a* and 140*b* communicate using the same frequency spectrum, e.g., 2.4 GHz, and the same communication channel, e.g., channel 1, and may further determine that due to the relative locations of the gateways, the communications from the gateways overlap with each other. The NTS 110 may determine, therefore, that there is a potential conflict between communications between the gateway 140*a* and the devices 162*a-c* on the one hand, and communication between the gateway 140*b* and the devices 172*a* on the other. In such a scenario, the NTS 110 may generate instructions for the gateway 140*a* to communicate with the devices 162*a-c* using a different communication channel than that used by the gateway 140*b*.

If the NTS 110 determines that there is frequently a conflict between communications with devices, the NTS 110 may determine to change the time schedule for delivering packets to devices so as to avoid or mitigate conflicts between communications. For example, the NTS 110 may schedule delivery of packets to the gateway 140*a* intended for the device 162*a* at a determined interval from delivery of packets to the gateway 140*b* intended for the device 172*a* so that the corresponding communications between the gateway 140*a* and the device 162*a* take place at a different time than the communications between the gateway 140*b* and the device 172*a*. The NTS 110 may intelligently queue packets at the CMTS in order to control delivery of packets. Packets directed to the gateway 140*a* may proceed through the CMTS 130 to the gateway 140*a*, while packets directed to the gateway 140*b* may be queued at the CMTS 130. Once the communication of data to the gateway 140*a* has finished, packets directed to the gateway 140*b* may be released from the queue at the CMTS 130 and delivered to the gateway 140*b*. Meanwhile packets directed to the gateway 140*a* may be queued at the CMTS 130. Processing may continue in this manner to avoid or mitigate communication interference between the two gateways 140*a* and 140*b*.

If the NTS 110 determines that there is frequently a conflict between communications with devices, the NTS 110 may determine to prioritize packets for delivery to a particular gateway or a particular device so as to avoid or mitigate interference. In an example scenario, the NTS 110 may determine to designate as prioritized packets those that are directed toward the device 162*a* relative to packets directed toward other devices. As a consequence, packets directed to the device 162*a* may be communicated by the gateway 140*a* prior to, or at a greater frequency, than packets directed to other devices.

At block 260, the NTS 110 communicates instructions to the relevant network devices in order to implement the adjustments to the communications in the network. In other words, the NTS 110 communicates instructions for implementing recomputed network traffic policies and flow information. The NTS 110 communicates in any suitable manner with relevant network devices such as, for example, the CMTSs 130, the gateways 140, and the secondary network devices 150, in order to implement the adjustments to the network communications. For example, the NTS 110 may communicate instructions through the network 108 to a particular gateway 140. The instructions may request that the particular gateway 140 perform any number of suitable adjustments or changes in operation. The instructions may instruct a particular gateway 140 or secondary network device 150 to change the communication channel that it is using for communication. In another example, the instructions may instruct the gateway 140 or the secondary network device 150 to give priority to communications with a particular wireless device. The instructions may require that the gateway 140 or the secondary network device 150 give priority to packets directed to a particular wireless device.

The NTS 110 may communicate instructions to the CMTS 130 that is responsible for communicating data through to particular gateways 140. The instructions communicated to a CMTS 130 may indicate to communicate data directed to particular devices in a particular manner. For example, the NTS 110 may have determined based upon the received data that communications between the gateway 140*a* and the device 162*a* are interfering with communications between the gateway 140*b* and the device 172*a*. The NTS 110 may instruct the CMTS 130 that communicates data to the gateway 140*a* and the gateway 140*b* to stagger communications to the devices 162*a* and 172*b* so that the data will be transmitted by the gateway 140*a* to the device 162*a* without interfering with the communication of data by the gateway 140*b* to the device 172*a*. The instructions from the NTS 110 may modify the operation of components of the wired network, e.g., the CMTS 130 and the gateway 140, in order to improve communications with the wireless devices 162*a* and 172*a* outside the wired network.

It will be appreciated that instructions to change the operation of the network may be implemented at the CMTS-level 130, the gateway-level 140, the secondary network device-level 150, or any combination thereof and may be updated dynamically as the devices 162*a-h*, 172*a-b* enter and exit any level of the network. To implement dynamic updating, a feedback loop may be introduced wherein the gateways 140 and the secondary network devices 150 continually report network data to the NTS 110, which may then dynamically adjust existing service flows based on that information. In FIG. 2, this feedback loop is illustrated by the arrow from block 260 to block 210.

Additionally, the system may receive requests corresponding to a desired level of service and adjust operations within the network so as to provide that level of service. For example, a user in a home may intend to view a particular program at a particular time on a particular device in their home and may wish to have a high level of service during the program. In an example scenario, a user may indicate an interest to have a high level of service while watching a particular football game on the television located in the user's bedroom. The disclosed system allows for users to request a level of service and, in response, modifies or adjusts the operation of the network, such as, for example, controlling bandwidth or communication channels, so as to provide the programming on the desired device at the level of service requested.

Figure 3:
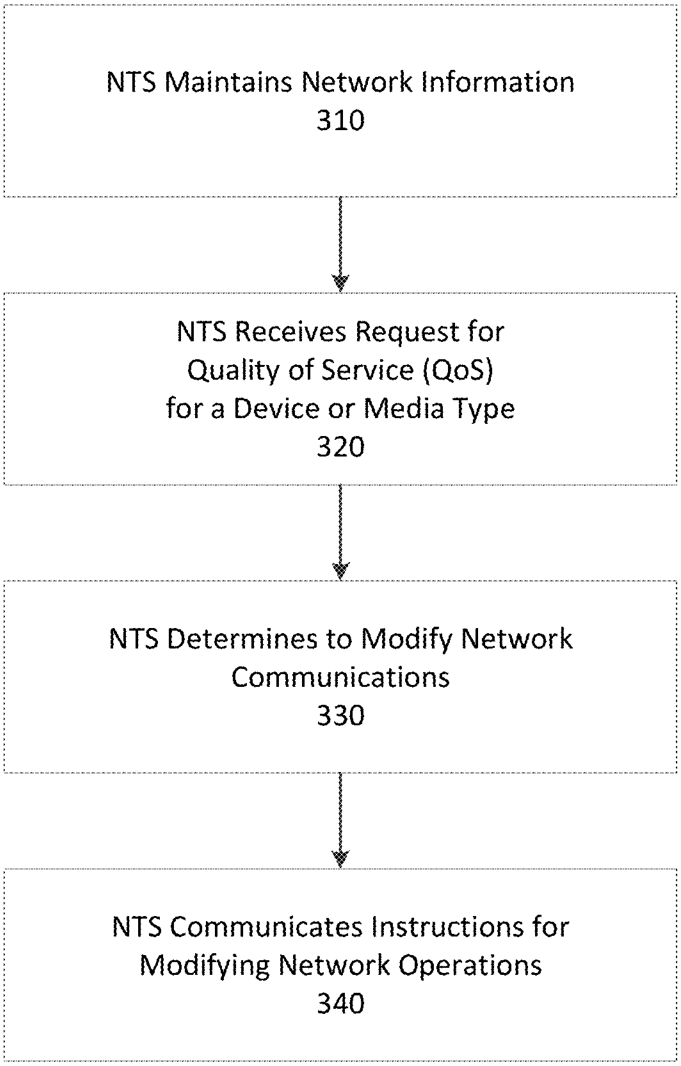
FIG. 3 depicts a flow diagram of an example process for scheduling network packets.

FIG. 3 is a flow diagram depicting example processing of requests to provide a desired level of service at a device. As shown, at block 310, the NTS 110 maintains data regarding the device components of network 108 and the communications with wireless devices through the network 108. The NTS 110 may aggregate data received from devices within network 108 as described above in connection with blocks 210 through 240 of FIG. 2. As described above, the data collected and maintained by the NTS 110 may include, for example, WiFi parameters, connected device information, communication channels, packet flow information, and any other relevant network information.

At block 320, the NTS 110 receives a request for a desired level of service or quality of service (QoS) to be received at a particular device in the network. For example, a first user may want a certain device to have higher network priority over other devices, such as a TV having better and quicker network access than a cell phone. Or, the first user may want certain media types to have higher priority, such as sports games having higher quality and speed than web browsing, or a gaming system having higher bandwidth than a TV show. The user may use an interface provided by a user device (162*a-h*, 172*a-b*), a gateway 140, or other device to identify the desired quality of service. Alternatively, the user may use a web page or any other suitable method to enter the QoS request. The selected QoS setting is communicated to the NTS 110. Communication may happen via any suitable method, including HTTP or any method described.

At block 330, the NTS 110 determines to modify network communications based on the received request. The NTS 110 may determine adjustments that should be made to the operation of the network in order to provide the desired quality of service. Adjustments may include any modifications in how data is delivered that may help better align the network with the requested QoS settings. For example, the adjustments identified by the NTS 110 may comprise identifying communication conflicts that might prevent the desired level of service from being obtained. The adjustments may comprise determining that one or more gateways 140 and/or secondary network devices 150 should change the channel used to communicate with particular devices. In another example, the NTS 110 may determine that communications between a particular gateway or secondary network device and particular devices should be prioritized at a particular time or when delivering a particular type of data. The NTS 110 may determine that the bandwidth devoted to communications with a particular device or of a particular media type should be expanded or reduced. In still another example, the NTS 110 may determine that the scheduling of packets from a CMTS 130 to a plurality of devices connected to particular gateways 140 or secondary network devices 150 should be timed or scheduled so as not to interfere. The NTS 110 may identify any combination of adjustments to the operation of devices in network 108 in order to provide the desired level of service. The adjustments identified by the NTS 110 may be implemented at any and all levels of the network 108 including, for example, at a CMTS 130, a gateway 140, a secondary network device 150, or any combination thereof and may be updated dynamically as the devices 162*a-h* or 172*a-b* enter and exit any level of the network.

At block 340, the NTS 110 communicates instructions or provisioning data to the appropriate devices in the network for purposes of implementing the desired adjustments. The NTS 110 communicates in any suitable manner with relevant network devices such as, for example, the CMTSs 130, the gateways 140, and the secondary network devices 150, in order to implement the identified adjustments to the network communications. In an example scenario, the NTS 110 may communicate instructions through the network 108 to a particular gateway 140. The instructions may request that the particular gateway 140 perform any number of suitable adjustments or changes in operation. For example, the instructions may instruct a particular gateway 140 or secondary network device 150 to change the communication channel that it is using for communication. In another example scenario, the instructions may instruct the gateway 140 or secondary network device 150 to give priority to communications with a particular wireless device or to communications of a particular type or occurring at a particular time.

The NTS 110 may communicate instructions to the CMTS 130 that is responsible for communicating data through to particular gateways 140. For example, the instructions communicated to a CMTS 130 may indicate to communicate data directed to particular devices in a particular manner. The NTS 110 may have determined that the desired quality of service requires avoiding or mitigating conflicts between communications between the gateway 140*a* and the device 162*a* and communications between the gateway 140*b* and the device 172*a*. The NTS 110 may instruct the CMTS 130 that communicates data to the gateway 140*a* and the gateway 140*b* to stagger communications to the devices 162*a* and 172*b* so that the data will be transmitted by the gateway 140*a* to the device 162*a* without interfering with the communication of data by the gateway 140*b* to the device 172*a*.

After the NTS 110 communicates instructions and/or provisioning information to the various network devices, the system may operate consistent with the instructions. For example, if the instructions identified for a gateway 140 to give priority to communications with a particular device 162, the gateway 140 may prioritize communications with the device 162 during operation and may delay communications with another device while communications with the device 162 take place. In another example, the NTS 110 may have instructed a CMTS 130 to provide a high quality of service in delivering sporting event media to a first device 162*a* wirelessly connected to the gateway 140*a* in the home 142*a*. If the CMTS 130 subsequently receives sporting media data directed to the device 162*a*, the CMTS 130 may devote additional bandwidth to the communications directed to the device 162*a* while reducing the bandwidth devoted to communications with other devices including, for example, the device 172*a* connected through the gateway 140*b* which may be executing a relatively low-bandwidth application such as a web browser.

Figure 4:
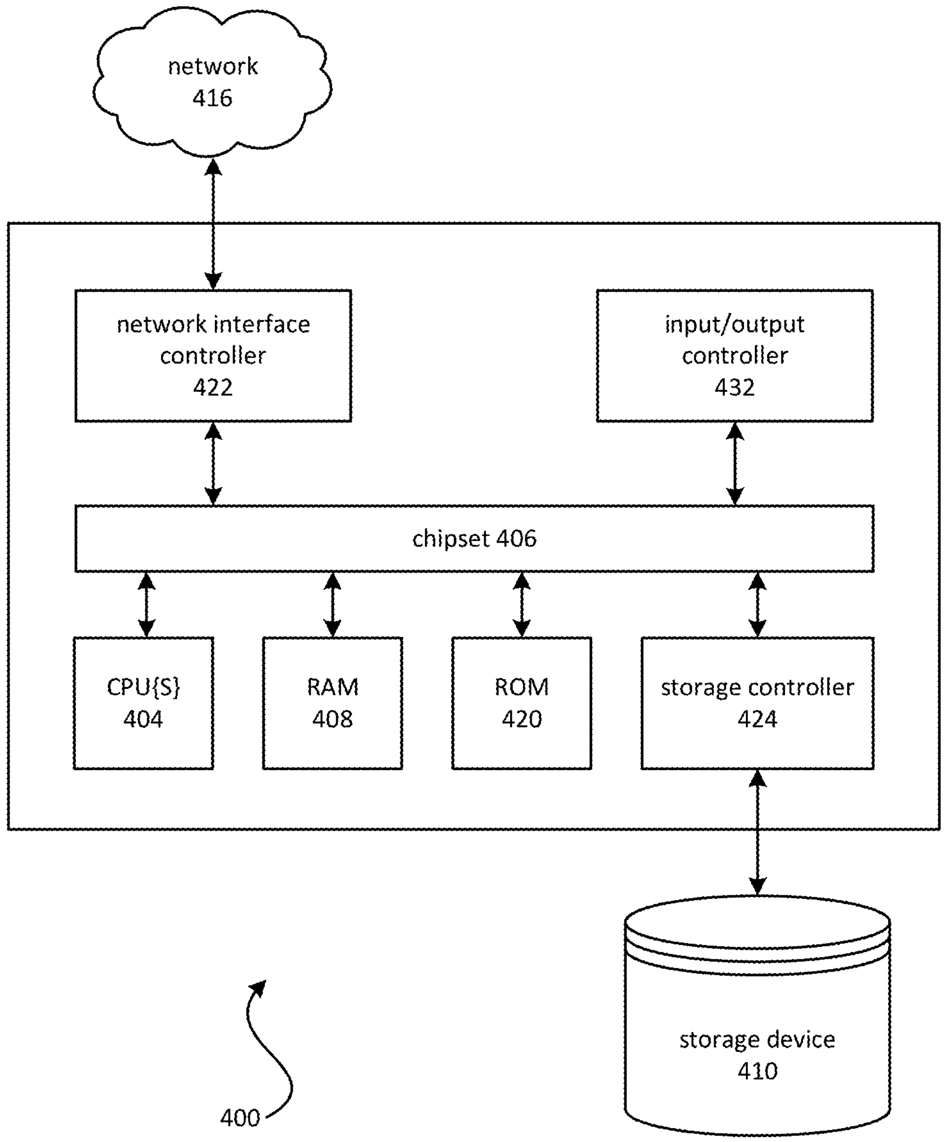
FIG. 4 depicts an example computing system.

FIG. 4 depicts a computing device that may be used in various components, such as any of the various devices depicted in FIG. 1. The computer architecture shown in FIG. 4 may correspond to a set-top box, remote control device, home automation system, desktop computer, laptop, tablet, network appliance, e-reader, smartphone, the NTS 110, a router 120, a CMTS 130, a gateway 140, a secondary network device 150, and the devices 162*a-h* and 172*a-b*, or other computing device, and may be utilized to execute any aspects of the computers described herein, such as to implement the operating procedures of FIGS. 2-3.

A computing device 400 may include a baseboard, or "motherboard," which is a printed circuit board to which a multitude of components or devices may be connected by way of a system bus or other electrical communication paths. One or more central processing units ("CPUs") 404 may operate in conjunction with a chipset 406. The CPU(s) 404 may be standard programmable processors that perform arithmetic and logical operations necessary for the operation of the computing device 400.

The CPU(s) 404 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 404 may, in various embodiments, be augmented with or replaced by other processing units, such as GPU(s) (not shown). GPU(s) may comprise processing units specialized for, but not necessarily limited to, highly parallel computations, such as graphics and other visualization-related processing.

A chipset 406 may provide an interface between the CPU(s) 404 and the remainder of the components and devices on the baseboard. The chipset 406 may provide an interface to a random access memory ("RAM") 408 used as the main memory in the computing device 400. The chipset 406 may further provide an interface to a computer-readable storage medium, such as a read-only memory ("ROM") 420 or non-volatile RAM ("NVRAM") (not shown), for storing basic routines that may help to start up the computing device 400 and to transfer information between the various components and devices. The ROM 420 or NVRAM may also store other software components necessary for the operation of the computing device 400 in accordance with the aspects described herein.

The computing device 400 may operate in a networked environment using logical connections to remote computing nodes and computer systems through a local area network ("LAN") 416. The chipset 406 may include functionality for providing network connectivity through a network interface controller (NIC) 422, such as a gigabit Ethernet adapter. The NIC 422 may be capable of connecting the computing device 400 to other computing nodes over the network 416. It should be appreciated that multiple NICs 422 may be present in the computing device 400, connecting the computing device to other types of networks and remote computer systems.

The computing device 400 may be connected to a mass storage device 410 that provides non-volatile storage for the computing device 400. The mass storage device 410 may store system programs, application programs, other program modules, and data, used to implement the processes and systems described in greater detail herein. The mass storage device 410 may be connected to computing device 400 through a storage controller 424 connected to the chipset 406. The mass storage device 410 may consist of one or more physical storage units. A storage controller 424 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 400 may store data on the mass storage device 410 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 410 is characterized as primary or secondary storage and the like.

For example, the computing device 400 may store information to the mass storage device 410 by issuing instructions through the storage controller 424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 may further read information from the mass storage device 410 by detecting the physical states or characteristics of one or more particular locations within the physical storage units.

In addition to the mass storage device 410 described above, the computing device 400 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 400.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

The mass storage device 410 may store an operating system utilized to control the operation of the computing device 400. For example, the operating system may comprise a version of the LINUX operating system. In another example, the operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. The mass storage device 410 may store other system or application programs and data utilized by the computing device 400.

The mass storage device 410 or other computer-readable storage media may also be encoded with computer-executable instructions, which, when loaded into the computing device 400, transforms the computing device from a general-purpose computing system into a special-purpose computer capable of implementing the aspects described herein. These computer-executable instructions transform the computing device 400 by specifying how the CPU(s) 404 transition between states, as described above. The computing device 400 may have access to computer-readable storage media storing computer-executable instructions, which, when executed by the computing device 400, may perform operating procedures depicted in FIGS. 2-3.

The computing device 400 may also include an input/output controller 432 for receiving and processing input from a number of input devices, such as a keyboard, a mouse, a touchpad, a touch screen, an electronic stylus, or other type of input device. Similarly, the input/output controller 432 may provide output to a display, such as a computer monitor, a flat-panel display, a digital projector, a printer, a plotter, or other type of output device. It will be appreciated that the computing device 400 may not include all of the components shown in FIG. 4, may include other components that are not explicitly shown in FIG. 4, or may utilize an architecture completely different than that shown in FIG. 4.

As described herein, a computing node may be a physical computing device, such as the computing device 400 of FIG. 4. A computing node may also include a virtual machine host process and one or more virtual machine instances operating on a physical computing device, such as the computing device 400. Computer-executable instructions may be executed by the physical hardware of a computing device indirectly through interpretation and/or execution of instructions stored and executed in the context of a virtual machine.

Applicant has described methods and systems for network based control of wireless gateway communications. It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the described methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of embodiments of the disclosed methods.

The present methods and systems may be understood more readily by reference to the following detailed description of preferred embodiments and the examples included therein and to the figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the disclosed embodiments may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices described. It is intended that the specification and example figures be considered as exemplary only, with a true scope and spirit being indicated by the following claims.

What is claimed:

1. A method comprising:

receiving first data indicating first characteristics of communications between one or more first user devices and a wireless gateway, the first data comprising video streaming packets;

receiving second data indicating second characteristics of communications between one or more second user devices and the wireless gateway, the second data comprising web browsing packets;

determining, based at least in part on the first data and the second data, a first adjustment to a priority associated with delivery of communications of the video streaming packets via the wireless gateway to the one or more first user devices relative to delivery of communications of the web browsing packets via the wireless gateway to the one or more second user devices;

causing, based on the first adjustment, the delivery of communications of the video streaming packets to be prioritized over the delivery of communications of the web browsing packets;

receiving third data indicating an update to the first characteristics and the second characteristics; and causing, based on the third data, a second adjustment to the priority associated with the delivery of communications of the video streaming packets via the wireless gateway to the one or more first user devices relative to the delivery of communications of the web browsing packets via the wireless gateway to the one or more second user devices.

2. The method of claim 1, wherein the first characteristics indicate at least one of:

a channel used for communication between the one or more first user devices and the wireless gateway;

a strength of a communication signal received from the wireless gateway;

interference experienced by the one or more first user devices in communicating with the wireless gateway;

an amount of data sent by a first user device of the one or more first user devices via the wireless gateway; or an amount of data received by the first user device via the wireless gateway.

3. The method of claim 1, wherein the causing the delivery of communications of the video streaming packets to be prioritized over the delivery of communications of the web browsing packets, is performed by a computing device comprising a cable modem termination system configured to send the at least one instruction to the wireless gateway.

4. The method of claim 1, wherein the causing the delivery of communications of the video streaming packets to be prioritized over the delivery of communications of the web browsing packets, causes an arrival of packets, at a first user device of the one or more first user devices via the wireless gateway, to be prioritized over other first user devices of the one or more first user devices and over the one or more second user devices.

5. The method of claim 3, wherein the first adjustment to the priority causes a delay in the delivery of communications via the wireless gateway.

6. The method of claim 1, wherein the adjustment causes an assignment of a higher or lower priority to the communications between the one or more first user devices and the wireless gateway than communications between the one or more second user devices and the wireless gateway.

7. The method of claim 1, wherein the adjustment causes a reduction in interference between the one or more first user devices and the one or more second user devices.

8. The method of claim 1, wherein the adjustment achieves a quality of service (QoS) level that was requested by a first user device of the one or more first user devices.

9. The method of claim 1, wherein in response to the first characteristics indicating that a first user device of the one or more first user devices is streaming the video streaming packets, prioritizing the video streaming packets over other packets.

10. The method of claim 1, wherein the first characteristics indicate that a first user device of the one or more first user devices is web browsing and wherein the adjustment prioritizes communications to other first user devices of the one or more first user devices over the web browsing.

11. A device comprising:

one or more processors; and memory storing instructions that, when executed by the one or more processors, cause the device to:

receive first data indicating first characteristics of communications between one or more first user devices and a wireless gateway, the first data comprising video streaming packets;

receive second data indicating second characteristics of communications between one or more second user devices and the wireless gateway, the second data comprising web browsing packets;

determine, based at least in part on the first data and the second data, a first adjustment to a priority associated with delivery of communications of the video streaming packets via the wireless gateway to the one or more first user devices relative to delivery of communications of the web browsing packets via the wireless gateway to the one or more second user devices;

cause, based on the first adjustment, the delivery of communications of the video streaming packets to be prioritized over the delivery of communications of the web browsing packets;

receive third data indicating an update to the first characteristics and the second characteristics; and cause, based on the third data, a second adjustment to the priority associated with the delivery of communications of the video streaming packets via the wireless gateway to the one or more first user devices relative to the delivery of communications of the web browsing packets via the wireless gateway to the one or more second user devices.

12. The device of claim 11, wherein the adjustment achieves a quality of service (QoS) level that was requested by a first user device of the one or more first user devices.

13. The device of claim 11, wherein in response to the first characteristics indicating that a first user device of the one or more first user devices is streaming video packets, prioritize the video streaming video packets over other packets.

14. The device of claim 11, wherein the first characteristics indicate that a first user device of the one or more first user devices is web browsing and wherein the adjustment prioritizes communications to other first user devices of the one or more first user devices over the web browsing.

15. A non-transitory computer-readable storage medium storing computer-readable instructions that, when executed by a processor, cause:

receiving first data indicating first characteristics of communications between one or more first user devices and a wireless gateway, the first data comprising video streaming packets;

receiving second data indicating second characteristics of communications between one or more second user devices and the wireless gateway, the second data comprising web browsing packets;

determining, based at least in part on the first data and the second data, a first adjustment to a priority associated with delivery of communications of the video streaming packets via the wireless gateway to the one or more first user devices relative to delivery of communications of the web browsing packets via the wireless gateway to the one or more second user devices;

causing, based on the first adjustment, the delivery of communications of the video streaming packets to be prioritized over the delivery of communications of the web browsing packets;

receiving third data indicating an update to the first characteristics and the second characteristics; and causing, based on the third data, a second adjustment to the priority associated with the delivery of communications of the video streaming packets via the wireless gateway to the one or more first user devices relative to the delivery of communications of the web browsing packets via the wireless gateway to the one or more second user devices.

16. The non-transitory computer-readable storage medium of claim 15, wherein the adjustment achieves a quality of service (QoS) level that was requested by a first user device of the one or more first user devices.

17. The non-transitory computer-readable storage medium of claim 15, wherein in response to the first characteristics indicating that a first user device of the one or more first user devices is streaming video packets, prioritizing the video streaming video packets over other packets.

18. The non-transitory computer-readable storage medium of claim 15, wherein the first characteristics indicate that a first user device of the one or more first user devices is web browsing and wherein the adjustment prioritizes communications to other first user devices of the one or more first user devices over the web browsing.

* * * * *